United States Patent [19]
Nishimura

[11] 4,044,737
[45] Aug. 30, 1977

[54] EXHAUST GAS CONTROL VALVE

[75] Inventor: Satomu Nishimura, Toyota, Japan

[73] Assignee: Toyota Jidosha Kogyo Kabushiki Kaisha, Toyota, Japan

[21] Appl. No.: 687,088

[22] Filed: May 17, 1976

[30] Foreign Application Priority Data

Nov. 10, 1975 Japan .......................... 50-151727[U]

[51] Int. Cl.$^{2}$ ...................... F02M 25/06; F16K 51/00
[52] U.S. Cl. ................................ 123/119 A; 137/375; 137/DIG. 8; 251/120; 251/368
[58] Field of Search ................... 123/119 A; 137/375; 251/120, 368

[56] References Cited

U.S. PATENT DOCUMENTS

| | | | |
|---|---|---|---|
| 1,173,871 | 2/1916 | Royer | 251/120 X |
| 2,133,983 | 10/1938 | Gaston | 251/368 X |
| 2,644,820 | 7/1953 | Gresham | 251/368 X |
| 3,026,899 | 3/1962 | Mischanski | 137/375 |
| 3,458,172 | 7/1969 | Burrows | 251/368 X |
| 3,972,312 | 8/1976 | Walker | 123/119 A |

*Primary Examiner*—Robert G. Nilson
*Attorney, Agent, or Firm*—Finnegan, Henderson, Farabow & Garrett

[57] ABSTRACT

An improved exhaust gas control valve of the type in which a vacuum actuated, valve-closure member controls the flow of exhaust gas into a gas chamber located between an inlet port and an outlet port, wherein the improvement comprises a corrosion-resistant metal liner covering the inside walls of the gas chamber, inlet port and outlet port that are exposed to the exhaust gas.

5 Claims, 1 Drawing Figure

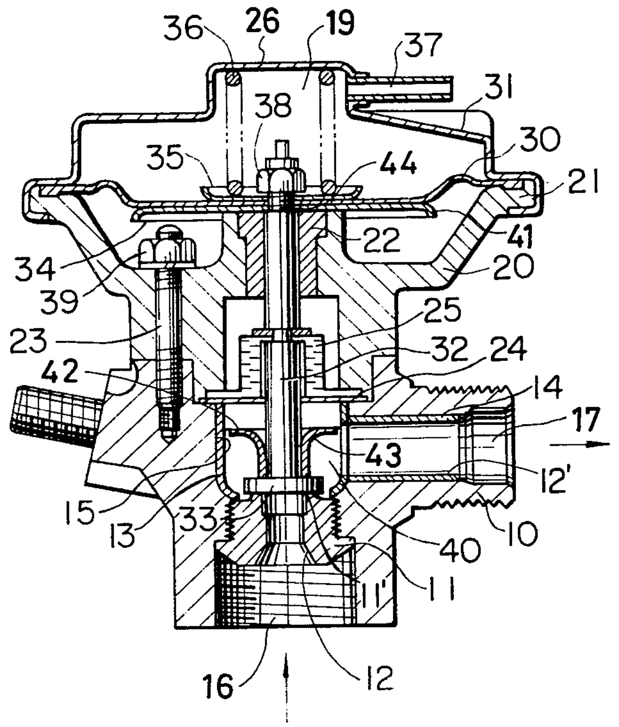
36
26
19
37
31
38
30
35
44
21
22
41
34
20
39
25
23
32
24
42
14
17
43
12'
15
13
33
40
10
11'
11
16
12

EXHAUST GAS CONTROL VALVE

BACKGROUND OF THE INVENTION

1. Field of the Invention

This invention relates to an improvement of an exhaust gas recirculation control valve. In particular, the invention relates to the addition of a corrosion-resistant lining in the control valve designed to resist the corrosive action of exhaust gas condensate.

2. Description of the Prior Art

An exhaust gas control valve is a known device for use in controlling the rate of flow of that portion of engine exhaust being recirculated through the engine for further combustion.

Internal combustion engine exhaust contains quantities of lead halide, sulfuric anhydride and other compounds which, when dissolved in liquid condensate, form a highly corrosive mixture. This mixture tends to accumulate on the interior wall surfaces of the prior art exhaust gas control valves corroding the exposed surfaces.

The interior walls of the prior art control valves, besides their predilection for corrosion, enhance the action of the corrosive mixture by having rough surfaces and sharp corners to which the mixture could attach and accumulate.

The present invention alleviates many of the corrosion problems of the prior art control valves by lining the interior walls exposed to the gases with a corrosion-resistant, smooth-surfaced metal. The improved control valve is also designed such that the metal lining reduces the number of sharp corners and crevices where the corrosive mixture condensates might accumulate.

SUMMARY OF THE INVENTION

As embodied and broadly described herein, the invention is an improved gas control valve utilizing a vacuum actuated valve-closure member for controlling the flow of gas containing corrosive condensate into a gas chamber located between an inlet port and an outlet port, the improvement comprising a corrsion-resistant metal liner covering the inside walls of the gas chamber and the inlet port exposed to the gas.

Preferably, the corrosion-resistant metal liner also covers the inner walls of the outlet port.

Preferably, the corrosion-resistant metal liner has a substantially smooth exposed surface for reducing irregularities to which corrosive condensates in the gas may attach.

It is also preferred that the inside walls of the gas chamber inlet port and outlet port and the corrosion-resistant metal liner attached to those walls have rounded smooth surfaced corners for reducing locations at which condensate in the gas may accumulate.

In a preferred embodiment, the exhaust gas control valve is of the type in which a valve-closure member for controlling the flow of exhaust gas into a gas chamber located between an inlet port and an outlet port is mechanically connected at a diaphragm by a valve stem, the diaphragm being one wall of a vacuum chamber in fluid flow communication with an engine vacuum source and being biased to a position where the valve-closure member closes the inlet port, wherein an increase in engine vacuum causes the diaphragm to move against the bias for opening the inlet port.

Mounted on and completely around the valve stem proximate the valve-closure member is a fluted flange which protects the valve stem from exposure to the gases and forms a wall of the gas chamber when the valve-closure member is moved to open the inlet port. The fluted flange provides rounded corners in the gas chamber for reducing locations at which condensated exhaust gas may accumulate. The exposed surfaces of the fluted flange and the inside walls of the gas chamber and inlet port are covered with a corrosion-resistant metal liner.

Preferably, the corrosion-resistant metal liner is of preformed stainless steel.

It may also be preferred that the corrosion-resistant metal liner be sprayed onto the inner walls of the exhaust gas chamber, inlet port and outlet port.

The invention is intended to provide an improved exhaust gas control valve capable of withstanding the corrosive action of exhaust gas condensate.

It is also intended that this improvement increase the useful life of the exhaust gas control valve while not significantly increasing its weight, cost of production or price.

BRIEF DESCRIPTION OF THE DRAWINGS

FIG. 1 is a cross-sectional view of a preferred embodiment of the invention.

DESCRIPTION OF THE PREFERRED EMBODIMENT

Reference will now be made in detail to the present preferred embodiment of the invention, an example of which is illustrated in the accompanying drawing.

In accordance with the invention, the improved gas control valve utilizes a vacuum-actuated closure member 33 for controlling the flow of gas containing corrosive condensate into a gas chamber 40 located between an inlet port 16 and an outlet port 17, the improvement comprising a corrosion-resistant metal liner 12 and 13 covering the inside walls of the gas chamber 40 and inlet port 16 exposed to the gas.

Preferably, the corrosion-resistant metal liner 12 and 13 has a substantially smooth exposed surface for reducing irregularities to which condensate in the gas may attach.

In accordance with the invention, the improved internal combustion engine exhaust gas control valve is of the type in which a valve-closure member 13 controls the flow of exhaust gas into a gas chamber 40 located between an inlet port 16 and an outlet port 17. The closure member 33 is mechanically connected to a diaphragm 30 by a valve stem 32, the diaphragm forming one wall of a vacuum chamber 19. The vacuum chamber 19 is in fluid flow communication with an engine vacuum source by means of a fluid conduit 37. The diaphragm 30 is biased to a closed position by a pair of springs 36 mounted between the diaphragm 30 and the opposite wall 26 of the vacuum chamber 19.

It can be seen that an increase in engine vacuum causes the diaphragm 30 to move against the bias of the spring 36 for opening the inlet port 16.

As embodied herein, the valve stem 32 of the valve-closure member 33 passes through an air seal expansion bellows 25, a bushing 22 and the diaphragm 30. In order to prevent deformation of the diaphragm 30, a spring support plate 35 and a valve stem support plate 41 are placed on either side of the diaphragm 30, the support plate resting on a shoulder 44 in the valve stem 32. The assembly of the support plates 35, 41 and the diaphragm 30 are locked to the valve stem 32, as by a nut 38.

The improvement to the internal combustion engine exhaust gas control valve comprises a corrosion-resistant metal liner 13 and 12 covering at least the inside walls of the exhaust gas chamber 40 and the inlet port 16 exposed to the exhaust gas for preventing corrosion caused by the condensate in the exhaust gas.

It is preferred that the corrosion-resistant metal liner 14 also cover the inside walls of the outlet port 17.

It is also preferred that the inside walls of the exhaust gas chamber 40, inlet port 16 and outlet port 17 and the attached corrosion-resistant metal liner have rounded corners for reducing locations at which the exhaust gas condensate may accumulate.

Preferably, a fluted flange 42 is mounted on and around the valve stem 32 proximate the valve closure member 33. The fluted flange 42 is a sleeve surrounding the valve stem 32. The end of the sleeve remote from the valve closure member 33 is flared out from the valve stem 32 forming a concave, curved surface surrounding the valve stem, the periphery of which is proximate the vertical walls 15 of the gas chamber 40. The flange 42 thereby completely protects the valve stem 32 from exposure to the gas and also forms a curved wall of the gas chamber 40 when the valve closure member 33 is moved to open the inlet port 16. The fluted flange 42 also serves to restrict movement of the valve stem 32 by being stopped against a stop 24.

The exposed surface of the fluted flange 42 is covered with a corrosion-resistant metal liner 43 which serves to protect the fluted flange 42 and the valve stem 32. The fluted flange 42 may be constructed of a corrosion-resistant metal.

Preferably, the corrosion-resistant metal liner is of preformed stainless steel. The corrosion-resistant liners 12 and 14 for the inlet valve 16 and outlet valve 17 may be preformed stainless steel tubes while the corrosion-resistant liner 13 for the exhaust gas chamber 40 may be a preformed stainless steel cup. The preformed stainless steel liners would be attached to their respective inner walls during assembly of the gas control valve.

It may be preferred that the corrosion-resistant metal liner be applied by means of spraying. The spraying technique would provide an inexpensive, easy application which would, at the same time, decrease overall weight and machine cost and increased service life of the control valve.

It is preferred, whether the liners are formed of sheet stainless steel or sprayed to the inner walls, that the surface of the liners be substantially smooth to reduce the irregularities to which corrosive exhaust gas condensate may attach.

It will be apparent to those skilled in the art that various modifications and variations could be made in the improvement to the exhaust gas control valve without departing from the scope or the spirit of the invention.

What is claimed is:

1. An improved internal combustion engine exhaust gas control valve of the type in which a valve-closure member for controlling the flow of exhaust gas into the gas chamber located between an inlet port and outlet port is mechanically connected to a diaphragm by a valve stem, said diaphragm forming one wall of a vacuum chamber in fluid flow communication with an engine vacuum source and being biased to a position where said valve closure member closes said inlet port and in which an increase in engine vacuum causes said diaphragm to move against said bias for opening said inlet port, the improvement comprising a corrosion-resistant metal liner covering the inside walls of said exhaust gas chamber, inlet port, and outlet port that are exposed to said exhaust gas and also including a fluted flange mounted on and around said valve stem proximate said valve-closure member, the periphery of said flange flaring out from said valve stem and towards the walls of said gas chamber for protecting said stem from exposure to said gas and for forming a curved wall of said gas chamber when said valve-closure member is moved to open said inlet port, the exposed surfaces of said flange also being covered with a corrosion-resistant metal liner, said fluted flange providing rounded corners in said gas chamber for reducing locations at which condensate in said exhaust gas may accumulate.

2. The improved exhaust gas control valve of claim 1 wherein the corrosion-resistant metal liner has a substantially smooth exposed surface for reducing irregularities to which condensate in said exhaust gas may attach.

3. The improved exhaust gas control valve of claim 1 wherein the inside walls of said exhaust gas chamber, inlet port and outlet port and the corrosion-resistant metal liner attached thereto have rounded corners for reducing locations at which condensate in said gas may accumulate.

4. The improved exhaust gas control valve of claim 1 wherein the corrosion-resistant metal liner is preformed stainless steel.

5. The improved exhaust gas control valve of claim 1 wherein the corrosion-resistant metal liner is of a material capable of being applied to the inner walls of the exhaust gas chamber, inlet port, outlet port and flange by spraying.

* * * * *